(12) United States Patent
Barnhoefer et al.

(10) Patent No.: US 8,766,902 B2
(45) Date of Patent: Jul. 1, 2014

(54) MANAGEMENT TECHNIQUES FOR VIDEO PLAYBACK

(75) Inventors: Ulrich T. Barnhoefer, Sunnyvale, CA (US); Wei H. Yao, Fremont, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1127 days.

(21) Appl. No.: 12/145,348

(22) Filed: Jun. 24, 2008

(65) Prior Publication Data

US 2009/0161020 A1 Jun. 25, 2009

Related U.S. Application Data

(60) Provisional application No. 61/016,103, filed on Dec. 21, 2007.

(51) Int. Cl.
G09G 3/36 (2006.01)
(52) U.S. Cl.
USPC .......................................................... 345/102
(58) Field of Classification Search
USPC .......................................................... 345/102
See application file for complete search history.

(56) References Cited

U.S. PATENT DOCUMENTS

| | | | |
|---|---|---|---|
| 5,717,422 A | 2/1998 | Fergason | |
| 5,758,091 A | 5/1998 | Hannah | |
| 5,808,697 A | 9/1998 | Fujimura et al. | |
| 5,930,402 A | 7/1999 | Kim | |
| 5,967,636 A | 10/1999 | Stark et al. | |

(Continued)

FOREIGN PATENT DOCUMENTS

| | | |
|---|---|---|
| CN | 1155807 A | 7/1997 |
| CN | 1665298 A | 9/2005 |

(Continued)

OTHER PUBLICATIONS

Kerofsky, Louis et al., "26.2: Distinguished Paper: Brightness Preservation for LCD Backlight Reduction", Sharp Laboratories of America, Camas, Washington, USA, 1242 SID 06 Digest.

(Continued)

Primary Examiner — Jonathan Boyd
(74) Attorney, Agent, or Firm — Fletcher Yoder PC

(57) ABSTRACT

Embodiments of a system that includes one or more integrated circuits are described. During operation, the system may determine an intensity setting of the light source based on at least a portion of a video image, such as the portion of the transformed video image that includes spatially varying visual information in the video image. Moreover, the system may modify the video image so that a product of the intensity setting and a transmittance associated with the modified video image approximately equals a product of a previous intensity setting and a transmittance associated with the video image. For example, the modification may include scaling brightness values in the transformed video image. Next, the system may identify a region in the video image in which the scaling of the brightness values results in a visual artifact associated with reduced contrast. For example, the region may include a bright region surrounded by a darker region. Then, the system may reduce the scaling of the brightness values in the region to, at least partially, restore the contrast, thereby reducing the visual artifact. Additionally, the system may spatially filter the brightness values in the video image to reduce a spatial discontinuity between the brightness values of pixels within the region and the brightness values in a remainder of the video image.

20 Claims, 11 Drawing Sheets

(56) References Cited

U.S. PATENT DOCUMENTS

| | | |
|---|---|---|
| 6,097,849 A | 8/2000 | Nevis |
| 6,151,004 A | 11/2000 | Kaneko |
| 6,300,931 B1 | 10/2001 | Someya et al. |
| 6,781,595 B2 | 8/2004 | Kobayashi et al. |
| 7,003,153 B1 | 2/2006 | Kerofsky |
| 7,102,697 B2 | 9/2006 | Lei et al. |
| 7,167,214 B2 | 1/2007 | Hirosue |
| 7,317,502 B2 | 1/2008 | Hu et al. |
| 7,403,318 B2 | 7/2008 | Miyazawa et al. |
| 7,454,137 B2 | 11/2008 | Lee et al. |
| 7,489,374 B2 | 2/2009 | Utsumi et al. |
| 7,592,996 B2 | 9/2009 | Brown Elliott et al. |
| 7,684,096 B2 | 3/2010 | Gonsalves |
| 7,796,143 B2 | 9/2010 | Huang |
| 2002/0063702 A1 | 5/2002 | Wada et al. |
| 2002/0101432 A1 | 8/2002 | Ohara et al. |
| 2002/0110282 A1 | 8/2002 | Kraft et al. |
| 2002/0126134 A1 | 9/2002 | Willis et al. |
| 2003/0053690 A1 | 3/2003 | Trifonov |
| 2003/0090455 A1 * | 5/2003 | Daly .................. 345/102 |
| 2003/0201968 A1 | 10/2003 | Itoh et al. |
| 2004/0113906 A1 | 6/2004 | Lew et al. |
| 2004/0257324 A1 | 12/2004 | Hsu |
| 2005/0093795 A1 * | 5/2005 | Lin et al. .................. 345/88 |
| 2005/0179706 A1 | 8/2005 | Childers |
| 2005/0184952 A1 | 8/2005 | Konno et al. |
| 2005/0195298 A1 | 9/2005 | Byun et al. |
| 2006/0119612 A1 | 6/2006 | Kerofsky |
| 2006/0139270 A1 | 6/2006 | Hong et al. |
| 2006/0146003 A1 | 7/2006 | Diefenbaugh et al. |
| 2006/0146351 A1 | 7/2006 | Lo et al. |
| 2006/0221046 A1 | 10/2006 | Sato |
| 2006/0221326 A1 | 10/2006 | Cok et al. |
| 2006/0262111 A1 | 11/2006 | Kerofsky |
| 2006/0268180 A1 * | 11/2006 | Chou .................. 348/673 |
| 2007/0040797 A1 | 2/2007 | Shih et al. |
| 2007/0097058 A1 | 5/2007 | Kim et al. |
| 2007/0109313 A1 | 5/2007 | Jo |
| 2007/0200811 A1 | 8/2007 | So |
| 2007/0268235 A1 | 11/2007 | Estevez et al. |
| 2007/0279372 A1 | 12/2007 | Brown Elliott et al. |
| 2008/0007655 A1 | 1/2008 | Fujisawa et al. |
| 2008/0018800 A1 | 1/2008 | Kodavalla |
| 2008/0074381 A1 | 3/2008 | Kumamoto |
| 2008/0204396 A1 | 8/2008 | Otome |
| 2008/0238840 A1 | 10/2008 | Raman et al. |
| 2009/0146941 A1 | 6/2009 | Fujine et al. |

FOREIGN PATENT DOCUMENTS

| | | |
|---|---|---|
| CN | 1797533 A | 7/2006 |
| EP | 0675645 A2 | 10/1995 |
| EP | 0800311 A1 | 4/1996 |
| EP | 1093295 A2 | 10/2000 |
| EP | 1231773 A1 | 2/2001 |
| EP | 1939850 A1 | 10/2006 |
| JP | 2006276677 A | 10/2006 |
| JP | 2006284981 A | 10/2006 |
| JP | 200721085 A | 2/2007 |
| JP | 2007140483 A | 6/2007 |
| KR | 20050120264 A | 12/2005 |
| TW | 200721085 A | 6/2007 |
| WO | 0227656 A2 | 4/2002 |
| WO | 2005093703 A1 | 10/2005 |
| WO | 2005119639 A1 | 12/2005 |
| WO | 2006092679 A2 | 9/2006 |
| WO | 2007021085 A1 | 2/2007 |
| WO | 2007046319 A1 | 4/2007 |
| WO | 2007055703 A1 | 5/2007 |

OTHER PUBLICATIONS

H. Seetzen et al., "Self-Calibrating wide color gamut dynamic range display", Human Vision and Electronic Imaging XII, vol. 6492, No. 64920z, Feb. 12, 2007, pp. 1-9, XP040236320.

Anonymous: Pulse-Amplitude-Modulation drive control of LEDs:, ip.com Journal, IP>COM Inc., West Henrietta, NY, Jul. 2, 2002, XP013003659, ISSN: 1533-0001.

Liang Cheng et al.; A Backlight optimization scheme for video playback on mobile devices, Consumer Communication and Networking Conference, 2006. CCNC 2006. 3rd IEEE, Issue Date: Jan. 8-10, 2006, vol. 2, on pp. 833-837, Print ISBN: 1-4244-0085-6, Date of Current Version: Feb. 13, 2006.

* cited by examiner

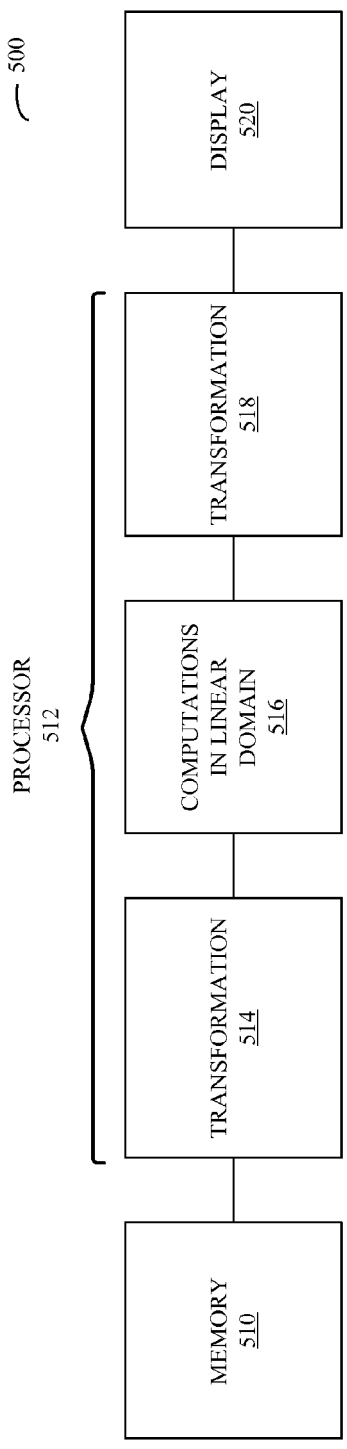
FIG. 5
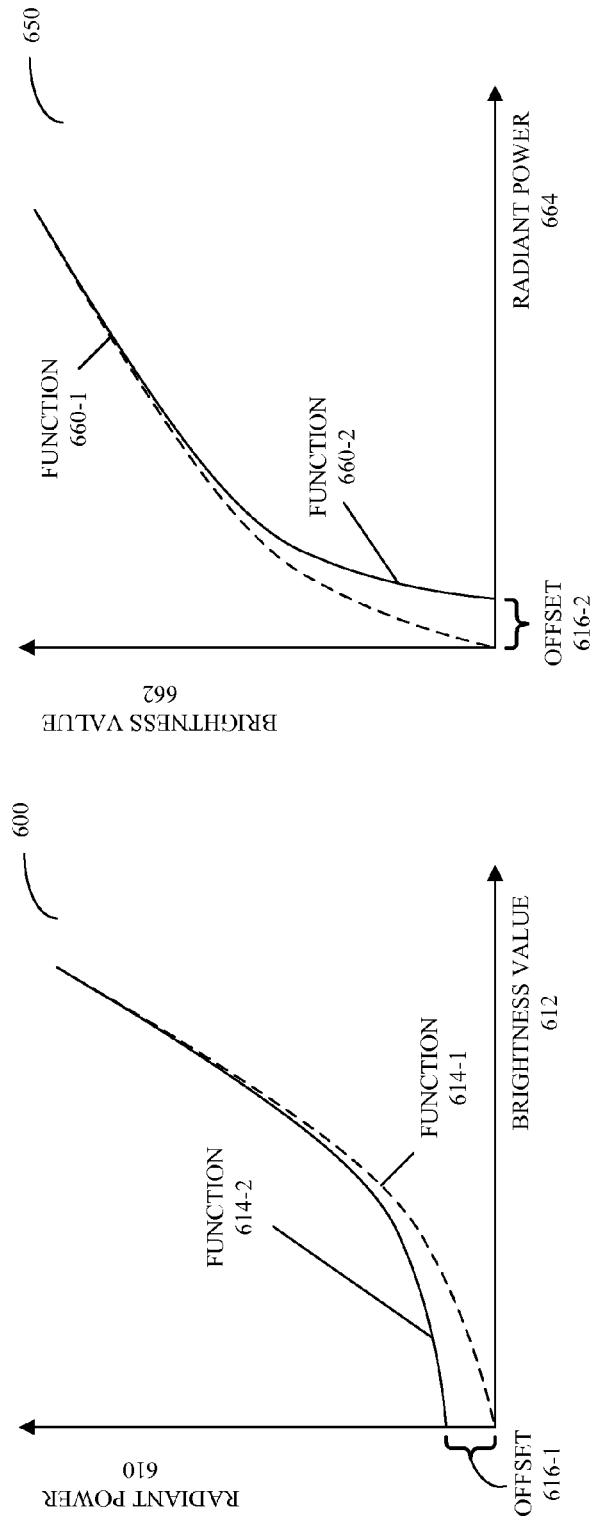
FIG. 6A
FIG. 6B

```
                                                          ─ 850
┌─────────────────────────────────────────────────────────┐
│   DETERMINE AN INTENSITY SETTING OF A LIGHT SOURCE, WHICH │
│ ILLUMINATES A DISPLAY THAT IS CONFIGURED TO DISPLAY A VIDEO IMAGE, │
│   AND SCALE BRIGHTNESS VALUES OF THE VIDEO IMAGE BASED ON A │
│                    BRIGHTNESS METRIC                    │
│                          826                            │
└─────────────────────────────────────────────────────────┘
                              │
                              ▼
┌─────────────────────────────────────────────────────────┐
│  RESTORE CONTRAST IN A REGION IN THE VIDEO IMAGE IN WHICH THE │
│   SCALING OF THE BRIGHTNESS VALUES RESULTS IN A VISUAL ARTIFACT │
│ ASSOCIATED WITH REDUCED CONTRAST BY, AT LEAST PARTIALLY, REDUCING │
│      THE SCALING OF THE BRIGHTNESS VALUES IN THE REGION │
│                          852                            │
└─────────────────────────────────────────────────────────┘
```

FIG. 8B

MANAGEMENT TECHNIQUES FOR VIDEO PLAYBACK

CROSS REFERENCE TO RELATED APPLICATIONS

This application claims priority under 35 U.S.C. 119(e) to U.S. Provisional Application Ser. No. 61/016,103, entitled "Management Techniques for Video Playback," by Ulrich T. Barnhoefer, Barry J. Corlett, Victor E. Alessi, Wei H. Yao and Wei Chen, filed on Dec. 21, 2007, the contents of which are herein incorporated by reference.

This application is related to: (1) pending U.S. patent application Ser. No. 12/145,368, entitled "Dynamic Backlight Adaptation for Video Images With Black Bars," by Ulrich T. Barnhoefer, Wei H. Yao, Wei Chen and Barry J. Corlett, (2) pending U.S. patent application Ser. No. 12/145,388, entitled "Dynamic Backlight Adaptation With Reduced Flicker," by Ulrich T. Barnhoefer, Wei H. Yao, Wei Chen, Barry J. Corlett and Victor E. Alessi, (3) pending U.S. patent application Ser. No. 12/145,396, entitled "Synchronizing Dynamic Backlight Adaptation," by Ulrich T. Barnhoefer, Wei H. Yao, Wei Chen and Barry J. Corlett, (4) pending U.S. patent application Ser. No. 12/145,331, entitled "Dynamic Backlight Adaptation for Black Bars With Subtitles," by Ulrich T. Barnhoefer, Wei H. Yao, Wei Chen, Barry J. Corlett and Jean-Didier Allegrucci, (5) pending U.S. patent application Ser. No. 12/145,176, entitled "Gamma-Correction Technique for Video Playback," by Ulrich Barnhoefer, Wei H. Yao, Wei Chen, Barry Corlett and Jean-Didier Allegrucci, (6) pending U.S. patent application Ser. No. 12/145,207, entitled "Light-Leakage-Correction Technique for Video Playback," by Ulrich Barnhoefer, Wei H. Yao, Wei Chen and Andrew Aitken, (7) pending U.S. patent application Ser. No. 12/145,308, entitled "Color-Adjustment Technique for Video Playback," by Ulrich Barnhoefer, Wei H. Yao, Wei Chen and Barry Corlett, (8) pending U.S. patent application Ser. No. 12/145,250, entitled "Technique for Adjusting White-Color-Filter Pixels," by Ulrich Barnhoefer, Wei H. Yao and Wei Chen, (9) pending U.S. patent application Ser. No. 12/145,266, entitled "Technique for Adjusting a Backlight During a Brightness Discontinuity," by Ulrich Barnhoefer, Wei H. Yao and Wei Chen, (10) pending U.S. patent application Ser. No. 12/145,292, entitled "Error Metric Associated With Backlight Adaptation," by Ulrich Barnhoefer, Wei H. Yao and Wei Chen, and (11) pending U.S. patent application Ser. No. 12/145,348, entitled "Management Techniques for Video Playback," by Ulrich T. Barnhoefer, Wei H. Yao and Wei Chen, the contents of all of which are herein incorporated by reference.

BACKGROUND

1. Field of the Invention

The present invention relates to techniques for dynamically adapting light sources for displays. More specifically, the present invention relates to circuits and methods for adjusting video signals and determining an intensity of a backlight on an image-by-image basis.

2. Related Art

Compact electronic displays, such as liquid crystal displays (LCDs), are increasingly popular components in a wide variety of electronic devices. For example, due to their low cost and good performance, these components are now used extensively in portable electronic devices, such as laptop computers.

Many of these LCDs are illuminated using fluorescent light sources or light emitting diodes (LEDs). For example, LCDs are often backlit by Cold Cathode Fluorescent Lamps (CCFLs) which are located above, behind, and/or beside the display. As shown in FIG. 1, which illustrates an existing display system in an electronic device, an attenuation mechanism 114 (such as a spatial light modulator) which is located between a light source 110 (such as a CCFL) and a display 116 is used to reduce an intensity of light 112 produced by the light source 110 which is incident on the display 116. However, battery life is an important design criterion in many electronic devices and, because the attenuation operation discards output light 112, this attenuation operation is energy inefficient, and hence can reduce battery life. Note that in LCD displays the attenuation mechanism 114 is included within the display 116.

In some electronic devices, this problem is addressed by trading off the brightness of video signals to be displayed on the display 116 with an intensity setting of the light source 110. In particular, many video images are underexposed, e.g., the peak brightness value of the video signals in these video images is less than the maximum brightness value allowed when the video signals are encoded. This underexposure can occur when a camera is panned during generation or encoding of the video images. While the peak brightness of the initial video image is set correctly (e.g., the initial video image is not underexposed), camera angle changes may cause the peak brightness value in subsequent video images to be reduced. Consequently, some electronic devices scale the peak brightness values in video images (such that the video images are no longer underexposed) and reduce the intensity setting of the light source 110, thereby reducing energy consumption and extending battery life.

However, it is often difficult to reliably determine the brightness of video images, and thus it is difficult to determine the scaling using existing techniques. For example, many video images are encoded with black bars or non-picture portions of the video images. These non-picture portions complicate the analysis of the brightness of the video images, and therefore can create problems when determining the trade-off between the brightness of the video signals and the intensity setting of the light source 110. Moreover, these non-picture portions can also produce visual artifacts, which can degrade the overall user experience when using the electronic device.

Additionally, because of gamma corrections associated with video cameras or imaging devices, many video images are encoded with a nonlinear relationship between brightness values and the brightness of the video images when displayed. Moreover, the spectrum of some light sources may vary as the intensity setting is changed. These effects can also complicate the analysis of the brightness of the video images and/or the determination of the appropriate trade-off between the brightness of the video image and the intensity setting of the light source 110.

Hence what is needed is a method and an apparatus that facilitates determining the intensity setting of a light source and which reduces perceived visual artifacts without the above-described problems.

SUMMARY

Embodiments of a technique for dynamically adapting the illumination intensity provided by a light source (such as an LED or a fluorescent lamp) that illuminates a display and for adjusting video images to be displayed on the display are described along with a system that implements the technique. For example, brightness values in a video image may be scaled and an intensity setting of the light source may be changed in order to reduce power consumption in the system. In particular, the intensity setting may be determined based on at least a portion of the video image, such as a picture or image portion of the video image. Moreover, the brightness values in the video image may be scaled based on a histogram of brightness values in the video image. In this way, a product of the intensity setting and a transmittance associated with the modified video image approximately equals (which can include equality with) a product of a previous intensity setting and a transmittance associated with the video image.

In some embodiments of the technique, the system identifies a region in the video image in which the scaling of the brightness values results in a visual artifact associated with reduced contrast. For example, the region may include a bright region surrounded by a darker region. Then, the system may reduce the scaling of the brightness values in the region to, at least partially, restore the contrast, thereby reducing the visual artifact. Moreover, the system may spatially filter the brightness values in the video image to reduce a spatial discontinuity between the brightness values of pixels within the region and the brightness values in a remainder of the video image.

BRIEF DESCRIPTION OF THE FIGURES

FIG. 5 is a block diagram illustrating an imaging pipeline in accordance with an embodiment of the present invention.

FIG. 6A is a graph illustrating transformations in accordance with an embodiment of the present invention.

FIG. 6B is a graph illustrating transformations in accordance with an embodiment of the present invention.

FIG. 8B is a flowchart illustrating a process for adjusting a brightness of pixels in a video image in accordance with an embodiment of the present invention.

Note that like reference numerals refer to corresponding parts throughout the drawings.

DETAILED DESCRIPTION

Figure 1:
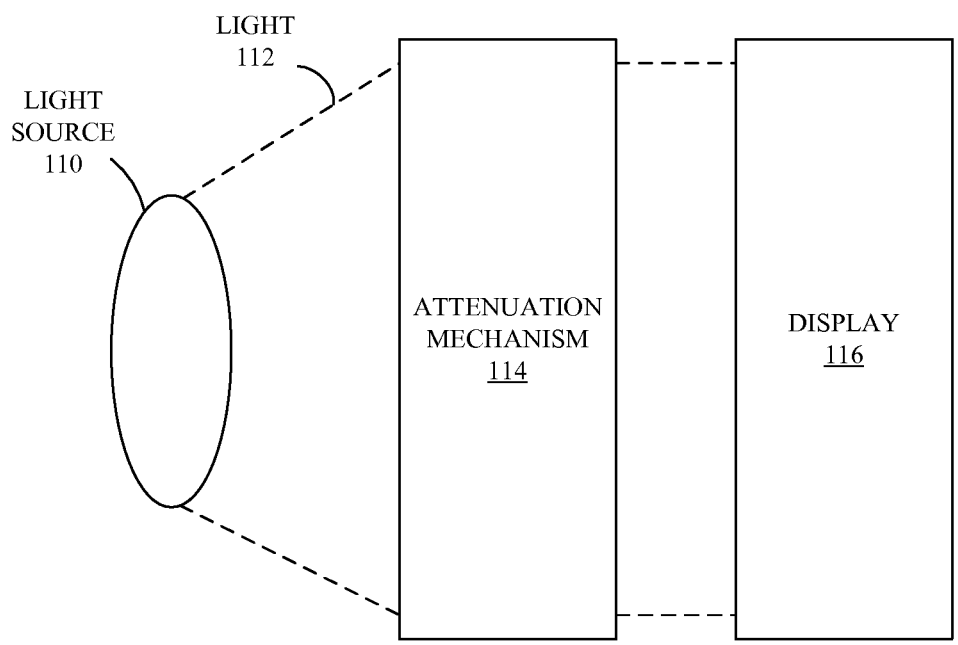
FIG. 1 is a block diagram illustrating a display system.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of hardware, software, and/or processes for using the hardware and/or software are described. Note that hardware may include a circuit, a portable device, a system (such as a computer system), and software may include a computer program product for use with the computer system. Moreover, in some embodiments the portable device and/or the system include one or more of the circuits.

These circuits, devices, systems, computer program products, and/or processes may be used to determine an intensity of a light source, such as an LED (including an organic LED or OLED) and/or a fluorescent lamp (including an electrofluorescent lamp). In particular, this light source may be used to backlight an LCD display in the portable device and/or the system, which displays video images (such as frames of video) in a sequence of video images. By determining a brightness metric (for example, a histogram of brightness values) of at least a portion of the one or more of the video images, the intensity of the light source may be determined. Moreover, in some embodiments video signals (such as the brightness values) associated with at least the portion of the one or more video images are scaled based on a mapping function which is determined from the brightness metric. In some embodiments, a product of an intensity setting of the light source and a transmittance associated with the resulting modified video image approximately equals (which can include equality with) a product of a previous intensity setting and a transmittance associated with the video image.

Additionally, one or more regions that are associated with visual artifacts may be identified. For example, these regions may include a bright portion surrounded by a darker portion. Scaling of the brightness values may reduce the contrast in the bright portion producing a visual artifact (e.g., an artifact that at least some users can perceive). To mitigate or eliminate these artifacts, scaling of the brightness values in at least the bright portion of a given region may be reduced. Moreover, the system may spatially filter the brightness values in the video image to reduce a spatial discontinuity between the brightness values of pixels within the other region and the brightness values in a remainder of the video image.

By determining the intensity setting of the light source on an image-by-image basis, these techniques facilitate a reduction in the power consumption of the light source. In an exemplary embodiment, the power savings associated with the light source can be between 15-50%. This reduction provides additional degrees of freedom in the design of portable devices and/or systems. For example, using these techniques portable devices may: have a smaller battery, offer longer playback time, and/or include a larger display.

Note that these techniques may be used in a wide variety of portable devices and/or systems. For example, the portable device and/or the system may include: a personal computer, a laptop computer, a cellular telephone, a personal digital assistant, an MP3 player, and/or another device that includes a backlit display.

Techniques to determine an intensity of the light source in accordance with embodiments of the invention are now described. In the embodiments that follow, a histogram of brightness values in a given video image is used as an illustration of a brightness metric from which the intensity of the light source is determined. However, in other embodiments one or more additional brightness metrics (such as the color saturation) are used, either separately or in conjunction, with the histogram.

Figure 2A:
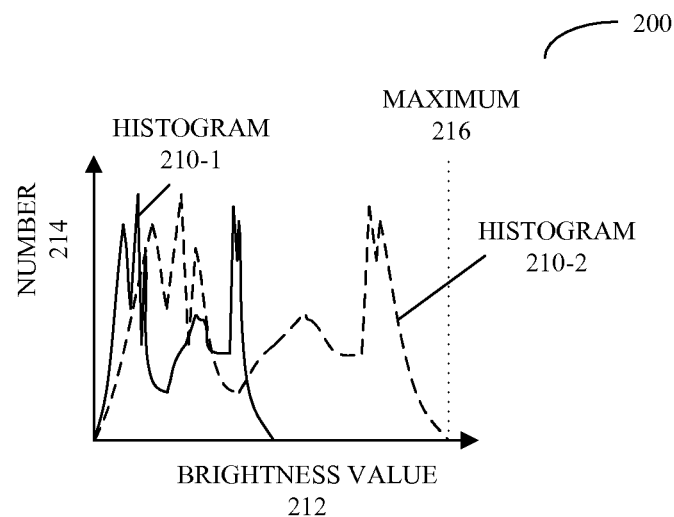
FIG. 2A is a graph illustrating histograms of brightness values in a video image in accordance with an embodiment of the present invention.

FIG. 2A presents a graph 200 illustrating an embodiment of histograms 210 of brightness values, plotted as a number 214 of counts as a function of brightness value 212, in a video image (such as a frame of video). Note that the peak brightness value in an initial histogram 210-1 is less than a maximum 216 brightness value that is allowed when encoding the video image. For example, the peak value may be associated with a grayscale level of 202 and the maximum 216 may be associated with a grayscale level of 255. If a gamma correction of a display that displays the video image is 2.2, the brightness associated with the peak value is around 60% of the maximum 216. Consequently, the video image is underexposed. This common occurrence often results during panning. In particular, while an initial video image in a sequence of video images, for example, associated with a scene in a movie, has a correct exposure, as the camera is panned the subsequent video images may be underexposed.

In display systems, such as those that include an LCD display (and more generally, those that include the attenuation mechanism 114 in FIG. 1), underexposed video images waste power because the light output by the light source 110 (FIG. 1) that illuminates the display 116 (FIG. 1) will be reduced by the attenuation mechanism 114 (FIG. 1).

However, this provides an opportunity to save power while maintaining the overall image quality. In particular, the brightness values in at least a portion of the video image may be scaled up to the maximum 216 (for example, by redefining the grayscale levels) or even beyond the maximum 216 (as described further below). This is illustrated by histogram 210-2. Note that the intensity setting of the light source is then reduced (for example, by changing the duty cycle or the current to an LED) such that the product of the peak value in the histogram 210-2 and the intensity setting is approximately the same as before the scaling. In an embodiment where the video image is initially 40% underexposed, this technique offers the ability to reduce power consumption associated with the light source by approximately 40%, i.e., significant power savings.

Figure 2B:
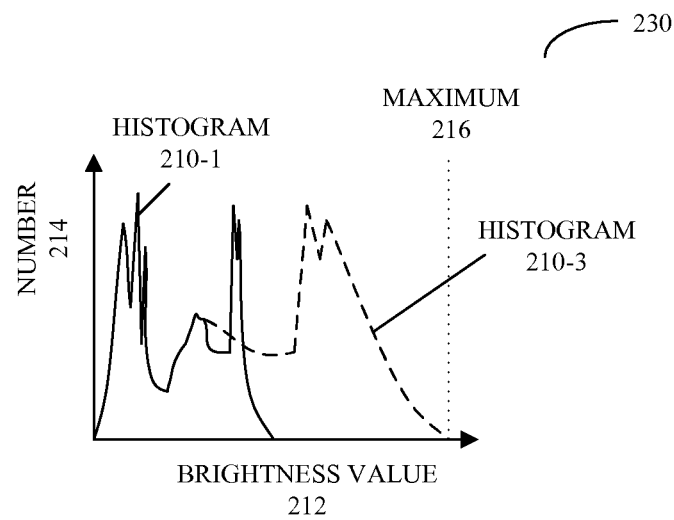
FIG. 2B is a graph illustrating histograms of brightness values in a video image in accordance with an embodiment of the present invention.

While the preceding example scaled the brightness of the entire video image, in some embodiments the scaling may be applied to a portion of the video image. For example, as shown in FIG. 2B, which presents a graph 230 illustrating an embodiment of histograms 210 of brightness values in the video image, brightness values in the video image associated with a portion of the histogram 210-1 may be scaled to produce histogram 210-3. Note that scaling of the brightness values associated with the portion of the histogram 210-1 may be facilitated by tracking a location (such as a line number or a pixel) associated with a given contribution to the histogram 210-1. In general, the portion of the video image (and, thus, the portion of the histogram) that is scaled may be based on the distribution of values in the histogram, such as: a weighted average, one or more moments of the distribution, and/or the peak value.

Moreover, in some embodiments this scaling may be non-linear and may be based on a mapping function (which is described further below with reference to FIG. 3). For example, brightness values in the video image associated with a portion of the histogram may be scaled to a value larger than the maximum 216, which facilitates scaling for video images that are saturated (e.g., video images that initially have a histogram of brightness values with peak values equal to the maximum 216). Then, a non-linear compression may be applied to ensure that the brightness values in the video image (and, thus, in the histogram) are less than the maximum 216.

Note that while FIGS. 2A and 2B illustrate scaling of the brightness values for the video image, these techniques may be applied to a sequence of video images. In some embodiments, the scaling and the intensity of the light source are determined on an image-by-image basis from a histogram of brightness values for a given video image in the sequence of video images. In an exemplary embodiment, the scaling is first determined based on the histogram for the video image and then the intensity setting is determined based on the scaling (for example, using a mapping function, such as that described below with reference to FIG. 3). In other embodiments, the intensity setting is first determined based on the histogram for the video image, and then the scaling is determined based on the intensity setting for this video image.

Figure 3:
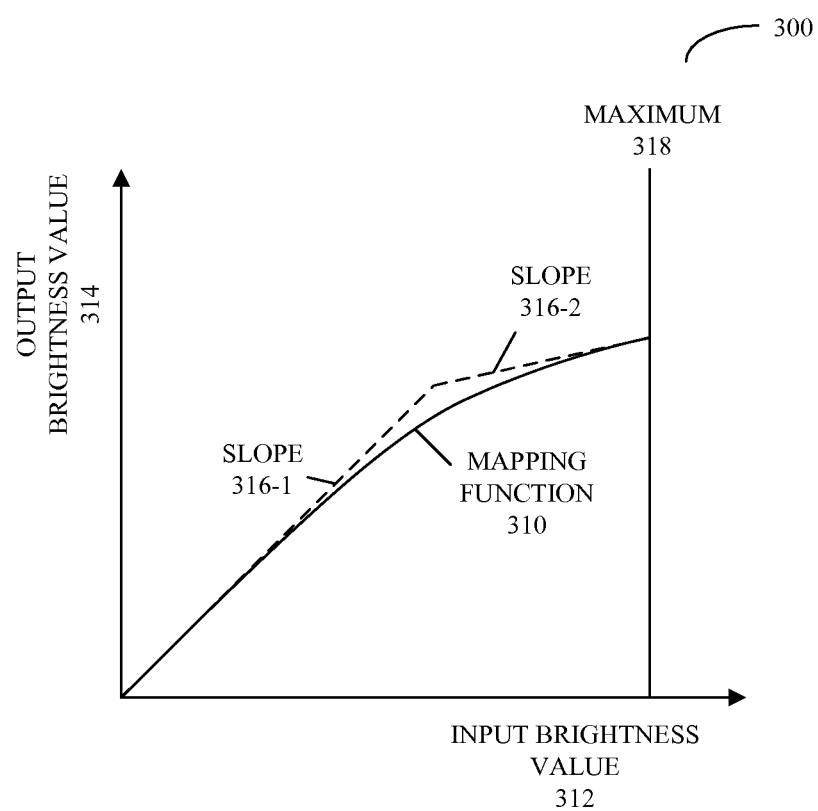
FIG. 3 is a graph illustrating a mapping function in accordance with an embodiment of the present invention.

FIG. 3 presents a graph 300 illustrating an embodiment of a mapping function 310, which performs a mapping from an input brightness value 312 (up to a maximum 318 brightness value) to an output brightness value 314. In general, the mapping function 310 includes a linear portion associated with slope 316-1 and a non-linear portion associated with slope 316-2. Note that in general the non-linear portion(s) may be at arbitrary position(s) in the mapping function 310. In an exemplary embodiment where the video image is underexposed, the slope 316-1 is greater than one and the slope 316-2 is zero.

Note that for a given mapping function, which may be determined from the histogram of the brightness values for at least a portion of the video image, there may be an associated distortion metric. For example, the mapping function 310 may implement a non-linear scaling of brightness values in a portion of a video image and the distortion metric may be a percentage of the video image that is distorted by this mapping operation.

In some embodiments, the intensity setting of the light source for the video image is based, at least in part, on the associated distortion metric. For example, the mapping function 310 may be determined from the histogram of the brightness values for at least a portion of the video image such that the associated distortion metric (such as a percentage distortion in the video image) is less than a pre-determine value, such as 10%. Then, the intensity setting of the light source may be determined from the scaling of the histogram associated with the mapping function 310. Note that in some embodiments the scaling (and, thus, the intensity setting) is based, at least in part, on a dynamic range of the attenuation mechanism 114 (FIG. 1), such as a number of grayscale levels.

Moreover, note that in some embodiments the scaling is applied to grayscale values or to brightness values after including the effect of the gamma correction associated with the video camera or the imaging device that captured the video image. For example, the video image may be compensated for this gamma correction prior to the scaling. In this way, artifacts, which are associated with the non-linear relationship between the brightness values in the video image and the brightness of the displayed video image, and which can occur during the scaling, can be avoided.

Figure 4:
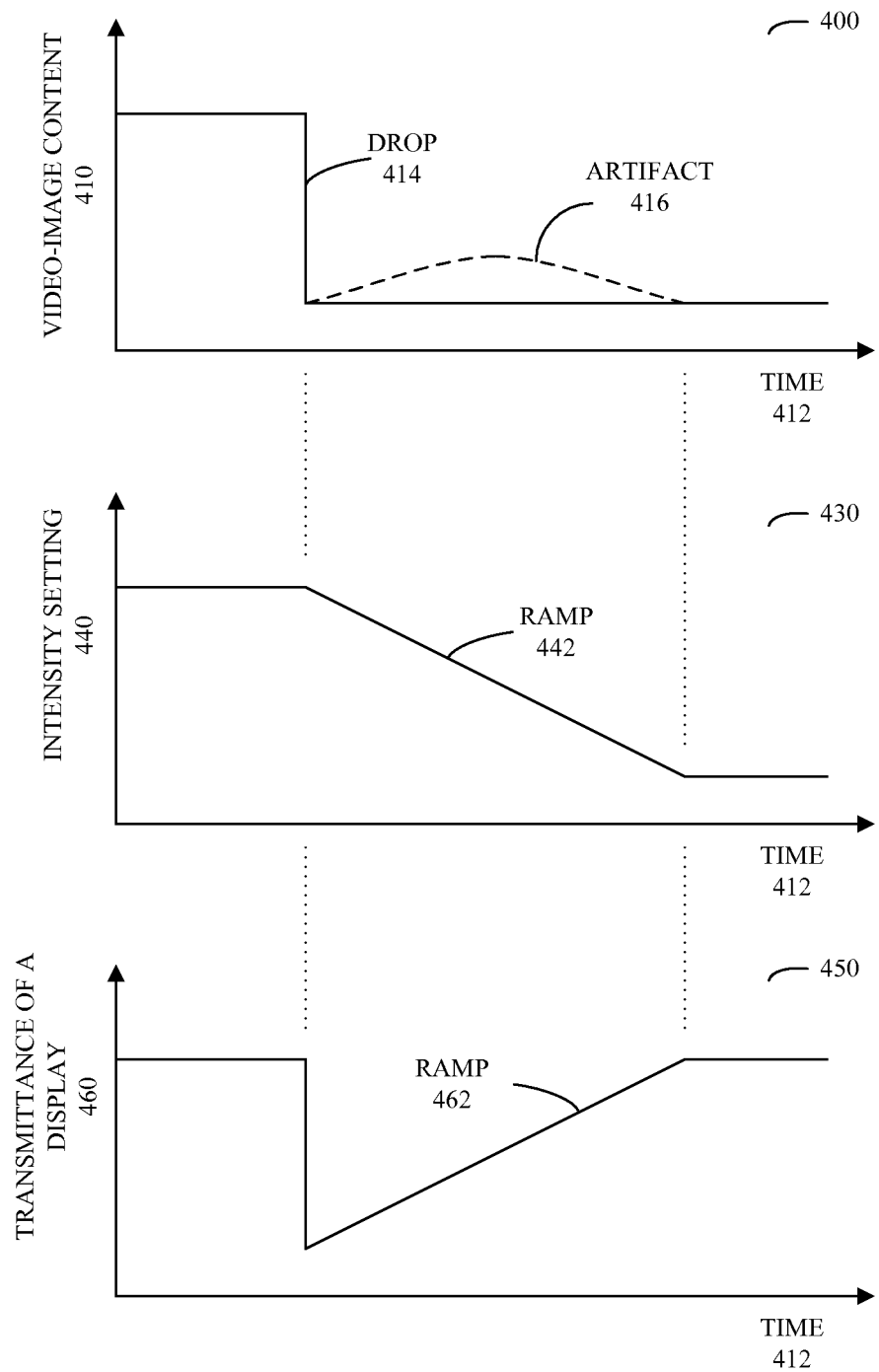
FIG. 4 is a series of graphs illustrating the impact of a non-linearity in brightness when adjusting an intensity setting of a light source and brightness values of a video image in accordance with an embodiment of the present invention.

FIG. 4 presents a series of graphs 400, 430 and 450 illustrating the impact of this non-linearity when adjusting an intensity setting of a light source and brightness values of a video image. Graph 400 shows video-image content 410 as a function of time 412, including a discontinuous drop 414 in the brightness value. This drop allows power to be saved by reducing the intensity setting of the light source. As shown in graph 430, which shows intensity setting 440 as a function of time 412, the intensity setting 440 can be decreased using a decreasing ramp 442 over a time interval, such as 10 frames. Moreover, as shown in graph 450, which shows transmittance of a display 460 as a function of time 412, by using an increasing ramp 462 (which corresponds to a 1/x function in a linear brightness domain) the desired brightness values associated with the video-image content 410 can be obtained.

However, if the computations of the scaling of the brightness values are performed in the initial brightness domain of the video image, which include the gamma correction of the video camera or the imaging device that captured the video image and, as such, have a non-linear relationship between the brightness values and the brightness of the displayed video image (i.e., the relationship between the brightness values and the brightness is non-linear), artifacts, such as artifact 416, can occur. This artifact may lead to a 20% jump in the brightness value.

Consequently, in some embodiments the video image is transformed from an initial (non-linear) brightness domain to a linear brightness domain in which the range of brightness values corresponds to substantially equidistant adjacent radiant-power values in a displayed video image. This is shown in FIG. 5, which presents a block diagram illustrating an imaging pipeline 500.

In this pipeline, the video image is received from memory 510. During processing in processor 512, the video image is converted or transformed from the initial brightness domain to the linear brightness domain using transformation 514. For example, transformation may compensate for a gamma correction of a given video camera or a given imaging device by applying an exponent of 2.2 to the brightness values (as described below with reference to FIG. 6A). In general, this transformation may be based on a characteristic (such as the particular gamma correction) of the video camera or the imaging device that captured the video image. Consequently, a look-up table may include the appropriate transformation function for a given video camera or a given imaging device. In an exemplary embodiment, the look-up table may include 12-bit values.

After transforming the video image, the processor 512 may perform computations in the linear domain 516. For example, the processor 512 may determine the intensity setting of the light source and/or scale or modify the brightness values of the video image (or, more generally, the content, including the color content, of the video image). In some embodiments, a product of the intensity setting and a transmittance associated with the modified video image approximately equals (which can include equality with) a product of a previous intensity setting and a transmittance associated with the video image. Moreover, the modifications to the video image may be based on a metric (such as a histogram of brightness values) associated with at least a portion of the video image, and may be performed on a pixel-by-pixel basis.

After modifying the video image, the processor 512 may convert or transform the modified video image using transformation 518 to another brightness domain characterized by the range of brightness values corresponding to non-equidistant adjacent radiant-power values in a displayed video image. For example, this transformation may be approximately the same as the initial brightness domain. Consequently, the transformation to the other brightness domain may restore an initial gamma correction (which is associated with a video camera or an imaging device that captured the video image) in the modified video image, for example, by applying an exponent of 1/2.2 to the brightness values in the modified video image. Alternatively, the transformation to the other brightness domain may be based on characteristics of the display, such as a gamma correction associated with a given display (as described below with reference to FIG. 6B). Note that the appropriate transformation function for the given display may be stored in a look-up table. Then, the video image may be output to display 520.

In some embodiments, the transformation to the other brightness domain may include a correction for an artifact in the display, which the processor 512 may selectively apply on a frame-by-frame basis. In an exemplary embodiment, the display artifact includes light leakage near minimum brightness in the display.

FIG. 6A presents a graph 600 illustrating transformations 614 (such as transformation 514 in FIG. 5) plotted as radiant power 610 (or photon count) as a function of brightness value 612 in the video image (as captured by a given video camera or a given imaging device). Transformation 614-1, which includes compensation or decoding for the gamma or gamma correction associated with the given video camera or the given imaging device, may be used to convert from an initial brightness domain to the linear brightness domain.

In some embodiments, as illustrated in transformation 614-2, an offset 616-1 (characterized by a shallower slope at smaller brightness values 612) along the radiant-power axis is included (in general, transformation 614-2 has a different shape than transformation 614-1). Note that this offset effectively restricts the range of the values of the radiant power 610 and may be associated with a characteristic of a given display (such as display 520 in FIG. 5) that will display the video image. For example, the offset 616-1 may be associated with light leakage in the display. Consequently, transformation 614-2 may intentionally distort the video image (as captured by the given video camera or the given imaging device) such that the range of values of the radiant power 610 corresponds to the range of radiant power associated with the display.

FIG. 6B, which presents a graph 650 illustrating transformations 660 (such as transformation 518 in FIG. 5) plotted as brightness values 662 in the video image (as displayed on a given display) as a function of radiant power 664 (or photon count). (Note that radiant power 664 is also referred to as the optical power of the light that will be emitted from the display when the video image is displayed.) Transformation 660-1, which includes compensation or encoding for the gamma or gamma correction associated with the given display (e.g., transformation 660-1 may approximately invert the display gamma), may be used to convert from the linear brightness domain to the other brightness domain.

In some embodiments, as illustrated in transformation 660-2, an offset 616-2 (characterized by a steeper slope at smaller values of the radiant power 664) along the radiant-power axis is included (in general, transformation 660-2 has a different shape than transformation 660-1). Note that this offset effectively restricts the range of the values of the radiant power 664. Consequently, transformation 660-2 may be a better approximation to or an exact inversion of the display gamma. Note that the offset 616-2 may be associated with a characteristic of the given display (such as display 520 in FIG. 5) that will display the video image. For example, the offset 616-2 may be associated with light leakage in the display. Moreover, transformation 660-2 may offer stable radiant power in the displayed video image even as the intensity setting and the brightness values are scaled.

One or more circuits or sub-circuits in a circuit, which may be used to modify the video image and/or to determine the intensity setting of the given video image in a sequence of video images, in accordance with embodiments of the invention are now described. These circuits or sub-circuits may be included on one or more integrated circuits. Moreover, the one or more integrated circuits may be included in devices (such as a portable device that includes a display system) and/or a system (such as a computer system).

Figure 7A:
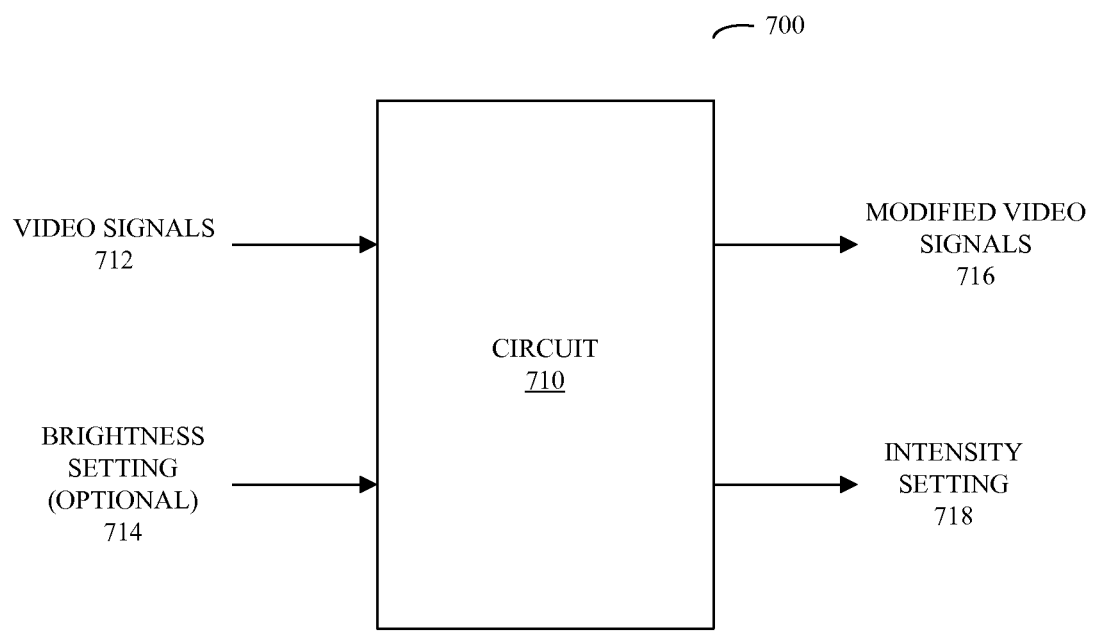
FIG. 7A is a block diagram illustrating a circuit in accordance with an embodiment of the present invention.

FIG. 7A presents a block diagram illustrating an embodiment 700 of a circuit 710. This circuit receives video signals 712 (such as RGB) associated with a given video image in a sequence of video images and outputs modified video signals 716 and an intensity setting 718 of the light source for the given video image. Note that the modified video signals 716 may include scaled brightness values for at least a portion of the given video image. Moreover, in some embodiments the circuit 710 receives information associated with video images in the sequence of video images in a different format, such as YUV.

In some embodiments, the circuit 710 receives an optional brightness setting 714. For example, the brightness setting 714 may be a user-supplied brightness setting for the light source (such as 50%). In these embodiments, the intensity setting 718 may be a product of the brightness setting 714 and an intensity setting (such as a scale value) that is determined based on the histogram of brightness values of the video image and/or the scaling of histogram of brightness values of the video image. Moreover, if the intensity setting 718 is reduced by a factor corresponding to the optional brightness setting 714, the scaling of the histogram of brightness values (e.g., the mapping function 310 in FIG. 3) may be adjusted by the inverse of the factor such that the product of the peak value in the histogram and the intensity setting 718 is approximately constant. This compensation based on the optional brightness setting 714 may prevent visual artifacts from being introduced when the video image is displayed.

Moreover, in some embodiments the determination of the intensity setting is based on one or more additional inputs, including: an acceptable distortion metric, a power-savings target, the gamma correction associated with the display (and more generally, a saturation boost factor associated with the display), a contrast improvement factor, a portion of the video image (and, thus, a portion of the histogram of brightness values) to be scaled, and/or a filtering time constant.

Figure 7B:
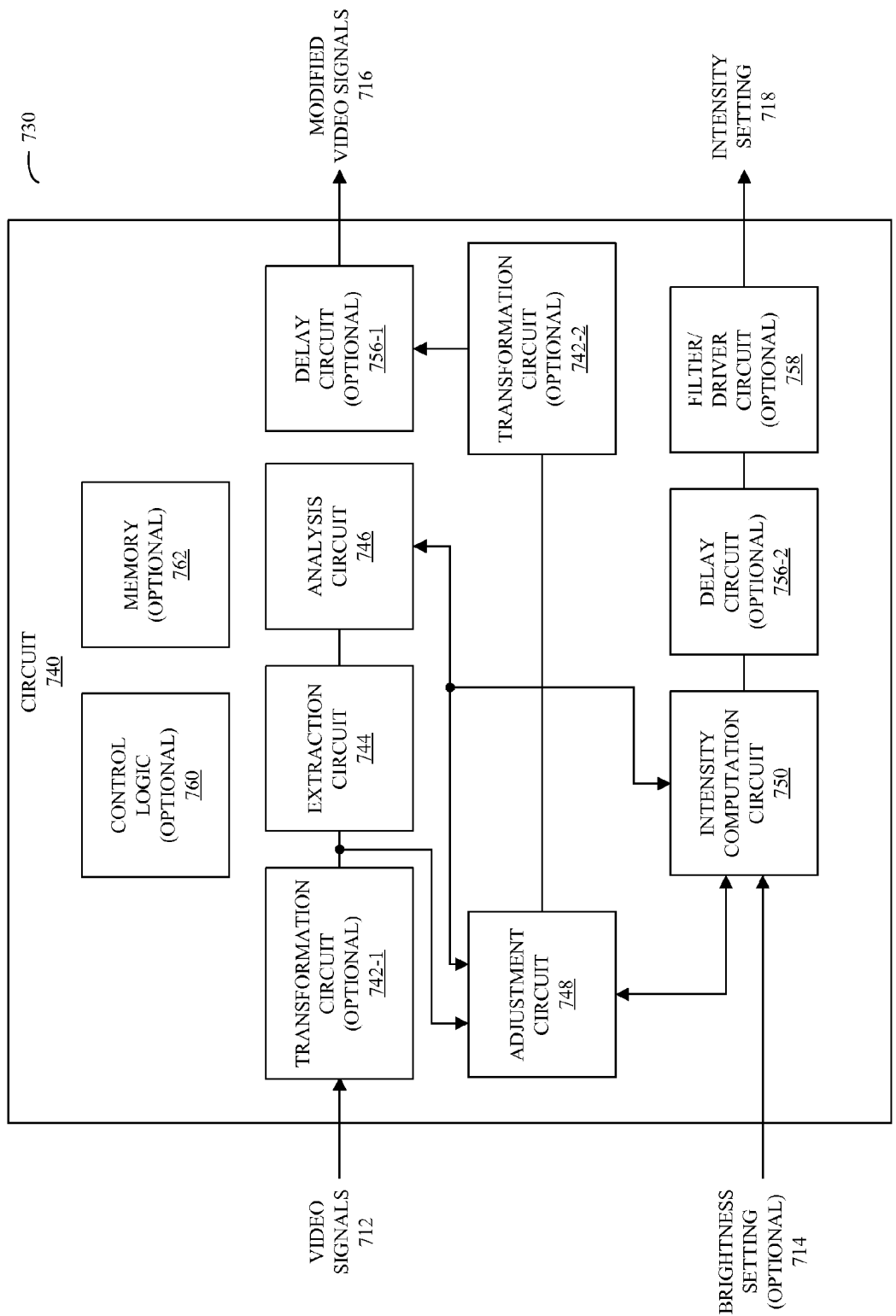
FIG. 7B is a block diagram illustrating a circuit in accordance with an embodiment of the present invention.

FIG. 7B presents a block diagram illustrating an embodiment 730 of a circuit 740. This circuit includes an interface (not shown) that receives the video signals 712 associated with the video image, which is electrically coupled to: optional transformation circuit 742-1, extraction circuit 744, and adjustment circuit 748. Note that the optional transformation circuit 742-1 may convert the video signals 712 to the linear brightness domain, for example, using one of the transformations 614 (FIG. 6A). Moreover, note that in some embodiments the circuit 740 optionally receives the brightness setting 714.

Extraction circuit 744 calculates one or more metrics, such as saturation values and/or a histogram of brightness values, based on at least some of the video signals, e.g., based on at least a portion of the video image. In an exemplary embodiment, the histogram is determined for the entire video image.

These one or more metrics are then analyzed by analysis circuit 746 to identify one or more subsets of the video image, such as picture and/or non-picture portions of the given image (which may be identified based on the associated portions of the histogram of brightness values). In general, the picture portion(s) of the video image include spatially varying visual information, and the non-picture portion(s) include the remainder of the video image.

Using the portion(s) of the one or more metrics (such as the histogram) associated with the one or more subsets of the video image, adjustment circuit 748 may determine the scaling of the portion(s) of the video image, and thus, the scaling of the one or more metrics. For example, the adjustment circuit 748 may determine the mapping function 310 (FIG. 3) for the video image, and may scale brightness values in the video signals based on this mapping function. Then, scaling information may be provided to intensity computation circuit 750, which determines the intensity setting 718 of the light source on an image-by-image basis using this information. As noted previously, in some embodiments this determination is also based on optional brightness setting 714. Moreover, an output interface (not shown) may output the modified video signals 716 and/or the intensity setting 718.

Prior to outputting the modified video signals 716, optional transformation circuit 742-2 may convert the video signals back to the initial (non-linear) brightness domain, which is characterized by a range of brightness values corresponding to non-equidistant adjacent radiant-power values in a displayed video image. Alternatively, optional transformation circuit 742-2 may convert the modified video signals 716 to another brightness domain, which is characterized by a range of brightness values corresponding to non-equidistant adjacent radiant-power values in a displayed video image. However, this transformation may be based on characteristic of the display, such as a leakage level of the display and/or a gamma correction associated with the display, for example, using one of the transformations 660 (FIG. 6B).

Moreover, in some embodiments the circuit 740 includes an optional filter/driver circuit 758. This circuit may be used to filter, smooth, and/or average changes in the intensity setting 718 between adjacent video images in the sequence of video images. This filtering may provide systematic under-relaxation, thereby limiting the change in the intensity setting 718 from image to image (e.g., spreading changes out over several frames). Additionally, the filtering may be used to apply advanced temporal filtering to reduce or eliminate flicker artifacts and/or to facilitate larger power reduction by masking or eliminating such artifacts. In an exemplary embodiment, the filtering implemented by the optional filter/driver circuit 758 includes a low-pass filter. Moreover, in an exemplary embodiment the filtering or averaging is over 2, 4, or 10 frames of video. Note that a time constant associated with the filtering may be different based on a direction of a change in the intensity setting and/or a magnitude of a change in the intensity setting.

In some embodiments, the optional filter/driver circuit 758 maps from a digital control value to an output current that drives an LED light source. This digital control value may have 7 or 8 bits.

In some embodiments, the circuit 740 uses a feed-forward technique to synchronize the intensity setting 718 with the modified video signals 716 associated with a current video image that is to be displayed. For example, the circuit 740 may include one or more optional delay circuits 756 (such as memory buffers) that delay the modified video signals 716 and/or the intensity setting 718, thereby synchronizing these signals. In an exemplary embodiment, the delay is at least as long as a time interval associated with the video image.

Note that in some embodiments the circuits 710 (FIG. 7A) and/or 740 include fewer or additional components. For example, functions in the circuit 740 may be controlled using optional control logic 760, which may use information stored in optional memory 762. In some embodiments, analysis circuit 746 jointly determines the scaling of the video signals and the intensity setting of the light source, which are then provided to the adjustment circuit 748 and the intensity computation circuit 750, respectively, for implementation.

Moreover, two or more components can be combined into a single component and/or a position of one or more components can be changed. In some embodiments, some or all of the functions in the circuits 710 (FIG. 7A) and/or 740 are implemented in software.

In some embodiments, there may be a region in the video image in which contributions from each of the pixels exceed the additional predetermined value. For example, the region may include pixels having brightness values exceeding a threshold (such as a brightness value of 0.5-0.8 relative to a maximum of 1 in the linear space) that is surrounded by pixels having brightness values less than the threshold. This region may be susceptible to distortion, such as that associated with reduced contrast when the brightness values are scaled. To reduce or prevent such distortion, the scaling of the brightness values in this region may be reduced. For example, the reduction may at least partially restore the contrast in the region.

Note that in some embodiments that region may be identified without calculating the error metric or using additional metrics in conjunction with the error metric. For example, the region may be identified if it has a certain number of pixels having brightness values exceeding the threshold (such as 3, 10 or 20% of the number of pixels in the video image). Alternatively, the region having pixels with brightness values exceeding the threshold may be identified by a certain size of the region.

Moreover, if the scaling of the brightness values is reduced, the given video image may be spatially filtered to reduce a spatial discontinuity between the brightness values of pixels within the region and the brightness values in a remainder of the given video image.

In an exemplary embodiment, the mapping function used to scale the brightness values (such as the mapping function 310 in FIG. 3) has two slopes (such as slopes 316 in FIG. 3). One slope is associated with dark and medium gray pixels and another, reduced slope (e.g., ⅓) for pixels having bright input brightness values (before the scaling. After the scaling, note that the contrast of pixels associated with the reduced slope is decreased. By selectively applying a local contrast enhancement to a portion of the video image, such as the region, user perception of visual artifacts may be reduced or eliminated. For example, spatial processing with a frame may be used to locally restore the original slope in a mapping function applied to pixels in the region. Consequently, there may be more than one mapping function for the given video image. Additionally, spatial filtering may be applied to ensure a smooth transition of intermediate states between pixels associated with one mapping function and pixels associated with another mapping function.

Note that local contrast enhancement may be a small-scale local contrast enhancement, such as edge sharpening (in which spatial processing is performed on in the vicinity or neighborhood of a few pixels), or may be local contrast enhancement of a small region (which is on a larger scale, but which is still small compared to the size of the given video image). For example, this larger scale local contrast enhancement may be performed on a region that includes between less than 1% and 20% of the pixel count in the given video image.

This local contrast enhancement may be implemented in several ways. Typically, the calculations are performed in the linear space where the brightness value of a given pixel is proportional to the radiant-power value. In one implementation, pixels associated with a reduced slope in the mapping function may be identified. Next, a blur function (such as Gaussian blur) may be applied to these pixels. In some embodiments, prior to applying this blur function, it is confirmed that either these pixels have a scalable value (associated with the scaling of the brightness values) of greater than 1 or an intermediate video image in which the scalable value of these pixels is greater than or equal to 1 is determined.

Then, another intermediate video image (for use in internal processing) may be determined. This intermediate image has a scalable value of greater than 1 in the blurred region and a scalable value equal to 1 in the remainder of the given video image.

Moreover, the original video image may be divided by the other intermediate video image. In most portions of the given video image, the division will be by 1 (i.e., there has been no change relative to the original video image). Consequently, the brightness values in the region in the original video image will be reduced and the total brightness range of the new version of the video image is also reduced (e.g., pixel brightness values range from 0 to 0.8 as opposed to 0 to 1 in the original video image). Note that if the blur function is chosen correctly, the local contrast in the region is almost unchanged in spite of the compression.

Having determined a new version of the given video image with a reduced range of brightness values, the amount of reduction in the brightness range can be selected. If the goal is to reduce the intensity setting of the backlight by a factor of, for example, 1.5, the range of brightness values in the new version of the given video image will be a factor of 1.5 lower than 1 (the maximum brightness value of the pixels). Consequently, the brightness value of the brightest point in the new version of the given video image is, in this example, 1/1.5. By using this technique, the local contrast can be preserved almost everywhere in the given video image. While the global contrast may be slightly reduced, a reduction by a factor of 1.5 in global contrast is a very small effect for the human eye.

Note that in some embodiments, the range of brightness values is reduced by scaling the entire video image without local processing. However, in this case, the local contrast may be affected in the entire video image and not just in the region.

Next, the new version of the video image may be used as an input to another mapping function, which is different that the mapping function that was already applied to the given video image. This other mapping function may not have the reduced slope. For example, the other mapping function may scale the brightness values of all pixels by a factor of 1.5. Consequently, the other mapping function may be a linear function with slope of 1.5. As a result the output video image may have increased brightness values for all of the pixels except those in the region, which will allow the intensity setting of the backlight to be reduced by a factor of 1.5.

In summary, in this implementation almost all pixels maintain their brightness values as in the original video image. Moreover, while the brightness values of the pixels in the region are not maintained, the local contrast in this region is maintained.

In a variation on this implementation, a more general approach is used. In particular, the global contrast may be reduced not only for those pixels that have high brightness values, but equally for all pixels. In the process, local contrast will be preserved. A wide variety of techniques are known in the art for reducing the global contrast (for example, by a factor of 1.5) without affecting the local contrast.

After this operation, the resulting video image may be scaled, for example, by a factor of 1.5. Consequently, the average of the brightness values of the pixels in the given video image will be increased or scaled, which allows the intensity setting of the backlight to be reduced. Note that while the given video image will (overall) have higher brightness values, the local contrast will be approximately unaffected.

In another implementation, pixels associated with the reduced slope in the mapping function are identified. Next, a sharpening technique may be applied to these pixels. For example, the sharpening technique may include: a so-called 'unsharpen filter' (which makes edges more pronounced), matrix kernel filtering, de-convolution, and/or a type of non-linear sharpening technique. After the contrast enhancement, the mapping function may be applied to these pixels, where the improved edge contrast will be reduced to a level similar to that in the video original image.

Note that the sharpening technique or, more generally, the local contrast enhancement may be applied to these pixels before the mapping function is applied. This may improve digital resolution. However, in some embodiments the sharpening technique may be applied to the identified pixels after the mapping function has been applied to these pixels.

In summary, in this implementation the brightness values of all of the pixels in the given video image are maintained in spite of the factor of 1.5 reduction in the intensity setting of the backlight. While the brightness values of the pixels in the region are not maintained, the edge contrast is maintained in this region.

In yet another implementation, instead of using one or more fixed mapping functions for the given video image, a spatially changing mapping function may be used, where, in principle, each pixel may have its own associated mapping function (e.g., a local-dependent mapping function is a function of x, y and the brightness value of the input pixel). Moreover, there may be pixels associated with the region and pixels associated with the remainder of the given video image. These two groups of pixels are not separable. In particular, there may be a smooth transition of intermediate states between them, via, the location-dependent mapping function.

Note that the intent of the location-dependent mapping function is to keep the slope associated with pixels in the neighborhood of a given pixel around 1. In this way, there is no reduction in the local contrast. For all other pixels (say 90% of the pixels in the given video image, the location-dependent mapping function may be the same as the (fixed) mapping function, except at the boundary or transition between pixels in the region and pixels in the remainder. This transition usually is non-monotonic with respect to the brightness value of the input pixel. However, with respect to x and y, this transition is smooth, i.e., continuous.

Figure 8A:
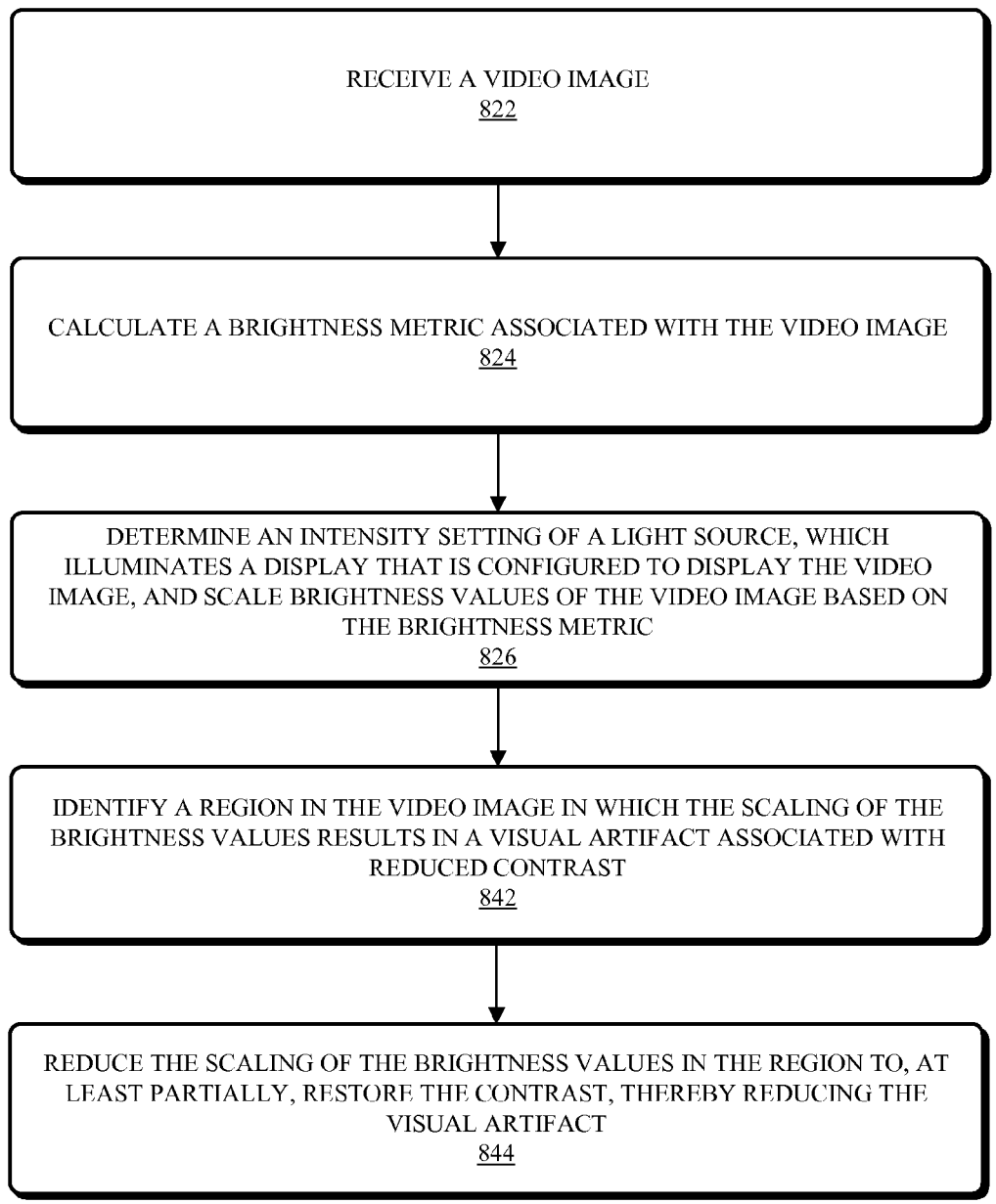
FIG. 8A is a flowchart illustrating a process for adjusting a brightness of pixels in a video image in accordance with an embodiment of the present invention.

Processes associated with the above-described techniques in accordance with embodiments of the invention are now described. FIG. 8A presents a flowchart illustrating a process 840 for adjusting a brightness of pixels in a video image, which may be performed by a system. During operation, this system receives a video image (822) and calculates a brightness metric associated with the video image (824). Next, the system determines an intensity setting of a light source, which illuminates a display that is configured to display the video image, and scale brightness values of the video image based on the brightness metric (826). Moreover, the system identifies a region in the video image in which the scaling of the brightness values results in a visual artifact associated with reduced contrast (842). Then, the system reduces the scaling of the brightness values in the region to, at least partially, restore the contrast, thereby reducing the visual artifact (844).

FIG. 8B presents a flowchart illustrating a process 850 for adjusting a brightness of pixels in a video image, which may be performed by a system. During operation, this system determines an intensity setting of a light source, which illuminates a display that is configured to display a video image, and scales brightness values for the video image based on a brightness metric associated with the video image (826). Next, the system restores contrast in a region in the video image in which the scaling of the brightness values results in a visual artifact associated with reduced contrast by, at least partially, reducing the scaling of the brightness values in the region (852).

Note that in some embodiments of the processes in 840 (FIG. 8A) and 850 there may be additional or fewer operations. Moreover, the order of the operations may be changed and/or two or more operations may be combined into a single operation.

Figure 9:
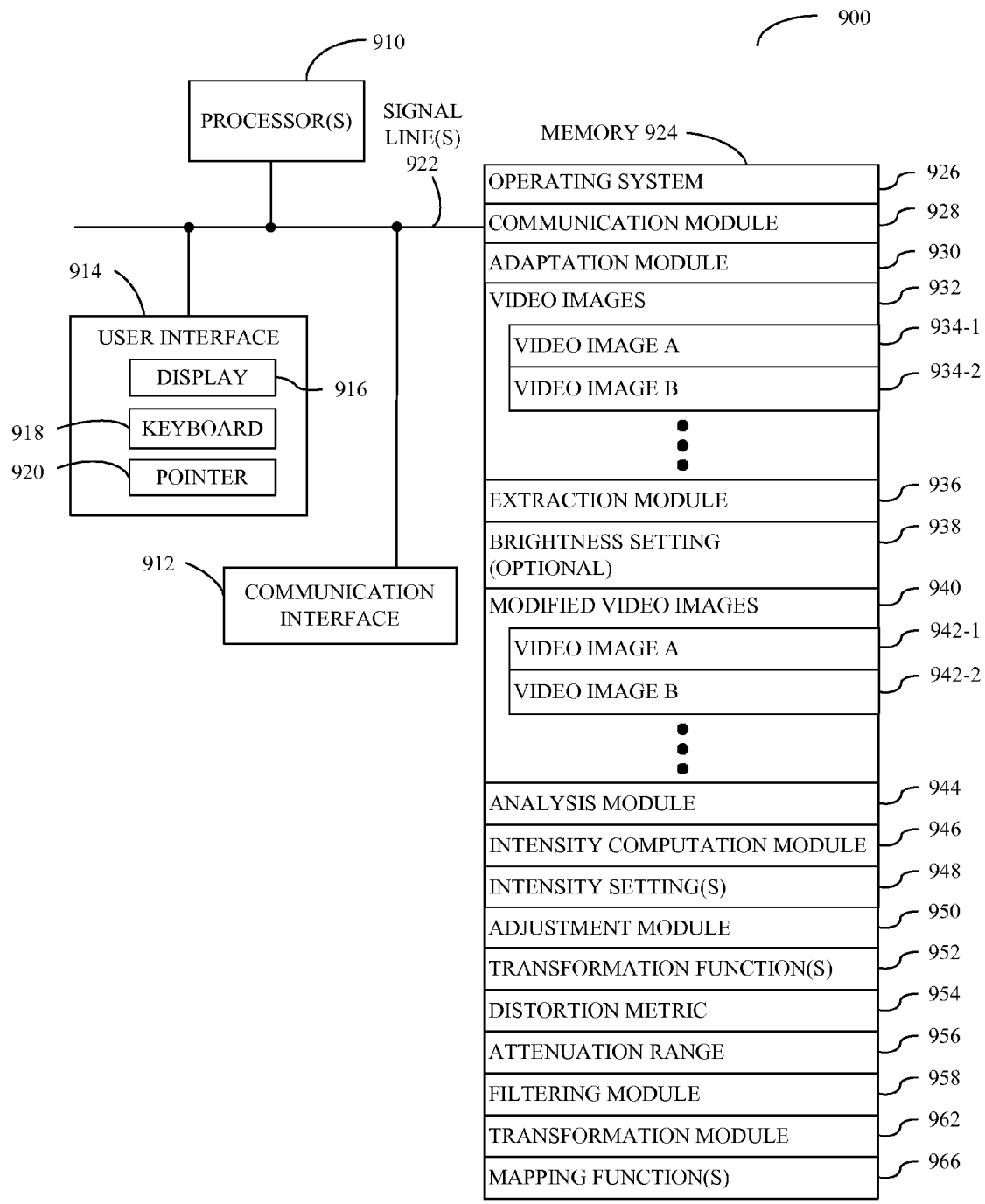
FIG. 9 is a block diagram illustrating a computer system in accordance with an embodiment of the present invention.

Computer systems for implementing these techniques in accordance with embodiments of the invention are now described. FIG. 9 presents a block diagram illustrating an embodiment of a computer system 900. Computer system 900 can include: one or more processors 910, a communication interface 912, a user interface 914, and one or more signal lines 922 electrically coupling these components together. Note that the one or more processing units 910 may support parallel processing and/or multi-threaded operation, the communication interface 912 may have a persistent communication connection, and the one or more signal lines 922 may constitute a communication bus. Moreover, the user interface 914 may include: a display 916, a keyboard 918, and/or a pointer 920, such as a mouse.

Memory 924 in the computer system 900 may include volatile memory and/or non-volatile memory. More specifically, memory 924 may include: ROM, RAM, EPROM, EEPROM, FLASH, one or more smart cards, one or more magnetic disc storage devices, and/or one or more optical storage devices. Memory 924 may store an operating system 926 that includes procedures (or a set of instructions) for handling various basic system services for performing hardware dependent tasks. Memory 924 may also store communication procedures (or a set of instructions) in a communication module 928. These communication procedures may be used for communicating with one or more computers and/or servers, including computers and/or servers that are remotely located with respect to the computer system 900.

Memory 924 may include multiple program modules (or a set of instructions), including: adaptation module 930 (or a set of instructions), extraction module 936 (or a set of instructions), analysis module 944 (or a set of instructions), intensity computation module 946 (or a set of instructions), adjustment module 950 (or a set of instructions), filtering module 958 (or a set of instructions), and/or transformation module 962 (or a set of instructions). Adaptation module 930 may oversee the determination of intensity setting(s) 948.

In particular, extraction module 936 may calculate one or more brightness metrics (not shown) based on one or more video images 932 (such as video image A 934-1 and/or video image B 934-2) and analysis module 944 may identify one or more subsets of one or more of the video images 932. Then, adjustment module 950 may determine and/or use one or more mapping function(s) 966 to scale one or more of the video images 932 to produce one or more modified video images 940 (such as video image A 942-1 and/or video image B 942-2). Note that the one or more mapping function(s) 966 may be based, at least in part, on distortion metric 954 and/or attenuation range 956 of an attenuation mechanism in or associated with display 916.

Based on the modified video images 940 (or equivalently, based on one or more of the mapping functions 966) and optional brightness setting 938, intensity computation module 946 may determine the intensity setting(s) 948. Moreover, filtering module 958 may filter changes in the intensity setting(s) 948.

In some embodiments, transformation module 962 converts one or more video images 932 to a linear brightness domain using one of the transformation functions 952 prior to the scaling or the determination of the intensity setting(s) 948. Moreover, after these computations have been performed, transformation module 962 may convert one or more modified video images 940 back to an initial (non-linear) or another brightness domain using another of the transformation functions 952. In some embodiments, a given transformation function in transformation functions 952 includes an offset, associated with light leakage in the display 916.

Instructions in the various modules in the memory 924 may be implemented in a high-level procedural language, an object-oriented programming language, and/or in an assembly or machine language. The programming language may be compiled or interpreted, e.g., configurable or configured to be executed by the one or more processing units 910. Consequently, the instructions may include high-level code in a program module and/or low-level code, which is executed by the processor 910 in the computer system 900.

Although the computer system 900 is illustrated as having a number of discrete components, FIG. 9 is intended to provide a functional description of the various features that may be present in the computer system 900 rather than as a structural schematic of the embodiments described herein. In practice, and as recognized by those of ordinary skill in the art, the functions of the computer system 900 may be distributed over a large number of servers or computers, with various groups of the servers or computers performing particular subsets of the functions. In some embodiments, some or all of the functionality of the computer system 900 may be implemented in one or more ASICs and/or one or more digital signal processors DSPs.

Computer system 900 may include fewer components or additional components. Moreover, two or more components can be combined into a single component and/or a position of one or more components can be changed. In some embodiments the functionality of the computer system 900 may be implemented more in hardware and less in software, or less in hardware and more in software, as is known in the art.

Figure 10:
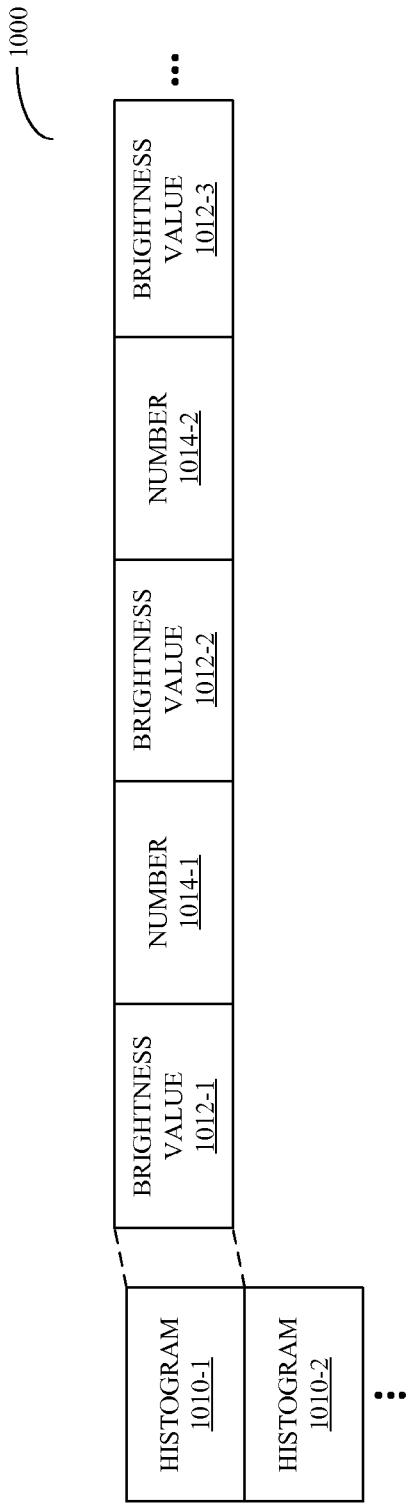
FIG. 10 is a block diagram illustrating a data structure in accordance with an embodiment of the present invention.

Data structures that may be used in the computer system 900 in accordance with embodiments of the invention are now described. FIG. 10 presents a block diagram illustrating an embodiment of a data structure 1000. This data structure may include information for one or more histograms 1010 of brightness values. A given histogram, such as histogram 1010-1, may include multiple numbers 1014 of counts and associated brightness values 1012.

Figure 11:
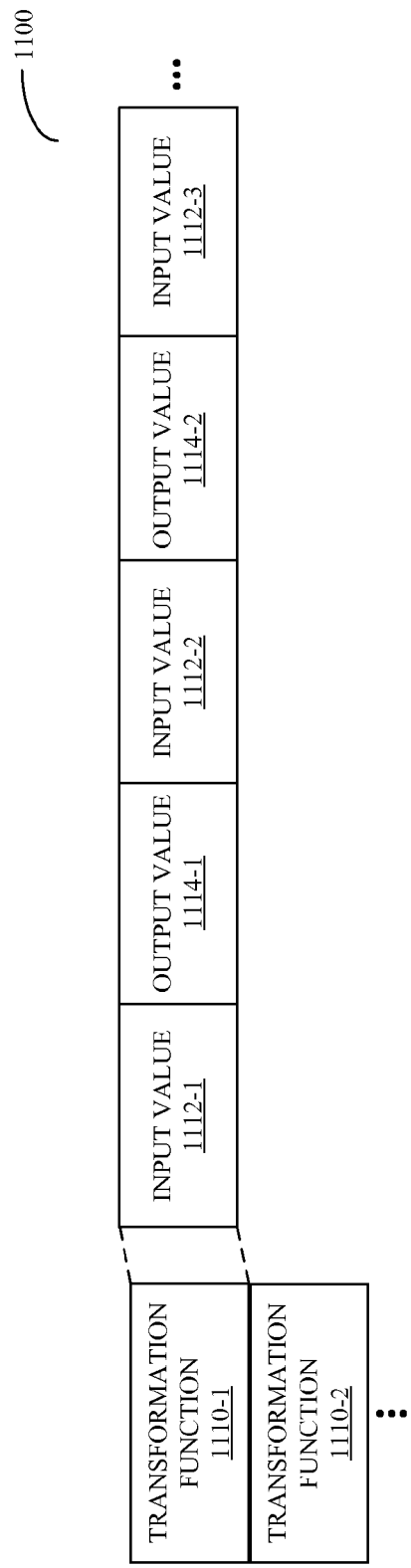
FIG. 11 is a block diagram illustrating a data structure in accordance with an embodiment of the present invention.

FIG. 11 presents a block diagram illustrating an embodiment of a data structure 1100. This data structure may include transformation functions 1110. A given transformation function, such as transformation function 1110-1, may include multiple pairs of input values 1112 and output values 1114, such as input value 1112-1 and output value 1114-1. This transformation function may be used to transform the video image from an initial brightness domain to a linear brightness domain and/or from the linear brightness domain to another brightness domain.

Note that that in some embodiments of the data structures 1000 (FIG. 10) and/or 1100 there may be fewer or additional components. Moreover, two or more components can be combined into a single component and/or a position of one or more components can be changed.

While brightness has been used as an illustration in many of the preceding embodiments, in other embodiments these techniques are applied to one or more additional components of the video image, such as one or more color components.

Embodiments of a technique for dynamically adapting the illumination intensity provided by a light source (such as an LED or a fluorescent lamp) that illuminates a display and/or for adjusting video images (such as one or more frames of video) to be displayed on the display are described. These embodiments may be implemented by a system.

For example, brightness values in a video image may be scaled and an intensity setting of the light source may be changed in order to reduce power consumption in the system. In particular, the intensity setting may be determined based on at least a portion of the video image, such as a picture or image portion of the video image. Moreover, the brightness values in the video image may be scaled based on a histogram of brightness values in the video image. In this way, a product of the intensity setting and a transmittance associated with the modified video image approximately equals (which can include equality with) a product of a previous intensity setting and a transmittance associated with the video image.

In some embodiments of the technique, the system identifies a region in the video image in which the scaling of the brightness values results in a visual artifact associated with reduced contrast (for example, the region may be identified using an analysis circuit). Then, the system may reduce the scaling of the brightness values in the region to, at least partially, restore the contrast, thereby reducing the visual artifact (for example, an adjustment circuit may reduce the scaling). Moreover, the system may spatially filter the brightness values in the video image to reduce a spatial discontinuity between the brightness values of pixels within the region and the brightness values in a remainder of the video image.

Note that the region may correspond to pixels having brightness values exceeding a predetermined threshold, and brightness values of pixels in the video image surrounding the region may be less than the predetermined threshold. Additionally, the region may be identified based on a number of pixels having brightness values exceeding the predetermined threshold. For example, the number of pixels may correspond to 3, 10 or 20% of pixels in the video image.

Another embodiment provides another method for adjusting a brightness of pixels in a video image, which may be implemented by the system. During operation, the system receives a video image and calculates a brightness metric associated with the video image. Next, the system determines an intensity setting of a light source, which illuminates a display that is configured to display the video image, and scale brightness values of the video image based on the brightness metric. Moreover, the system identifies a region in the video image in which the scaling of the brightness values results in a visual artifact associated with reduced contrast. Then, the system reduces the scaling of the brightness values in the region to, at least partially, restore the contrast, thereby reducing the visual artifact.

Another embodiment provides yet another method for adjusting a brightness of pixels in a video image, which may be implemented by the system. During operation, the system determines an intensity setting of a light source, which illuminates a display that is configured to display a video image, and scales brightness values for the video image based on a brightness metric associated with the video image. Next, the system restores contrast in a region in the video image in which the scaling of the brightness values results in a visual artifact associated with reduced contrast by, at least partially, reducing the scaling of the brightness values in the region.

Another embodiment provides one or more integrated circuits that implement one or more of the above-described embodiments.

Another embodiment provides a portable device. This device may include the display, the light source and the attenuation mechanism. Moreover, the portable device may include the one or more integrated circuits.

Another embodiment provides a computer program product for use in conjunction with a system. This computer program product may include instructions corresponding to at least some of the operations in the above-described methods.

Another embodiment provides a computer system. This computer system may execute instructions corresponding to at least some of the operations in the above-described methods. Moreover, these instructions may include high-level code in a program module and/or low-level code that is executed by a processor in the computer system.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system, comprising one or more integrated circuits, wherein the one or more integrated circuits are configured to:
   receive video image data;
   calculate a brightness metric of the video image data;
   determine an intensity setting of a light source based at least in part on the brightness metric, wherein the light source illuminates a display that is configured to display a visual representation of the video image data;
   scale brightness values of the video image data based at least in part on the brightness metric;
   identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and
   reduce the scaling of the brightness values in the one or more regions without adjusting the video image data outside the regions to, at least partially, restore the contrast, thereby reducing the visual artifact.

2. The system of claim 1, wherein the brightness metric comprises a histogram of brightness values in the video image data.

3. The system of claim 1, wherein the scaling of the brightness values is determined on a pixel-by-pixel basis in the video image data.

4. The system of claim 1, wherein the one or more integrated circuits are further configured to spatially filter the brightness values in the video image data to reduce a spatial discontinuity between the brightness values of pixels within the one or more regions and the brightness values in a remainder of the video image data.

5. The system of claim 1, wherein each region of the one or more regions corresponds to pixels having brightness values exceeding a predetermined threshold; and
   wherein brightness values of pixels in the video image data surrounding each region are less than the predetermined threshold.

6. The system of claim 5, wherein each region of the one or more regions contains more than 3, 10, or 20 percent of the pixels in the video image data.

7. The system of claim 1, wherein the video image data includes a frame of video.

8. The system of claim 1, wherein the brightness values are scaled based on a dynamic range of a mechanism that attenuates coupling of light from a light source to the display that is configured to display the visual representation of the video image data.

9. The system of claim 1, wherein the light source comprises a light-emitting diode.

10. The system of claim 1, wherein the light source comprises a fluorescent lamp.

11. A system, comprising one or more integrated circuits, wherein the one or more integrated circuits are configured to:
    determine an intensity setting of a light source based at least in part on a brightness metric of video image data, wherein the light source illuminates a display that is configured to display a visual representation of the video image data;
    scale brightness values for the video image data based at least in part on the brightness metric;
    identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and
    restore contrast in the one or more regions in the video image data in which the scaling of the brightness values results in a visual artifact associated with reduced contrast by, at least partially, reducing the scaling of the brightness values in the one or more regions without adjusting the video image data outside the regions.

12. A system, comprising:
    extraction logic operative to calculate a brightness metric associated with the of video image data based at least in part on received video signals;
    analysis logic electrically coupled to the extraction logic, the analysis logic configured to identify one or more regions in the video image data in which scaling of brightness of pixels results in a visual artifact associated with reduced contrast, wherein each region of the one or more regions contains more than one percent of pixels in a frame of the video image and comprises less than an entirety of the video image data; and
    adjustment logic electrically coupled to the analysis logic and the extraction logic, the adjustment logic configured to determine an intensity setting of a light source based at least in part on the brightness metric, which illuminates a display that is configured to display a visual representation of the video image data, and to adjust a brightness of pixels in the video image data unless the pixels are in the one or more regions.

13. A method comprising:
    receiving video image data;
    calculating a brightness metric of the video image data;
    determining an intensity setting of a light source based at least in part on the brightness metric, wherein the light source illuminates a display that is configured to display a visual representation of the video image data;
    scale brightness values of the video image data based at least in part on the brightness metric;
    identifying one or more regions in the video image data in which the scaling of the brightness values results in a visual artifact associated with reduced contrast, wherein each region of the one or more regions contains more than one percent of pixels in a frame of the video image and comprises less than an entirety of the video image data; and reducing the scaling of the brightness values in the one or more regions without adjusting the video image data outside the regions to, at least partially, restore the contrast, thereby reducing the visual artifact.

14. A method for adjusting brightness of pixels, comprising:

determining an intensity setting of a light source based at least in part on a brightness metric of video image data, wherein the light source illuminates a display that is configured to display a visual representation of the video image data;

scaling brightness values for the video image data based at least in part on the brightness metric;

identifying one or more regions in the video image data in which the scaling of the brightness values results in a visual artifact associated with reduced contrast, wherein each region of the one or more regions contains more than one percent of pixels in a frame of the video image and comprises less than an entirety of the video image data; and restoring contrast in the one or more regions in the video image data in which the scaling of the brightness values results in a visual artifact associated with reduced contrast by, at least partially, reducing the scaling of the brightness values in the one or more regions.

15. A computer program product for use in conjunction with a computer system, the computer program product comprising a non-transitory computer-readable storage medium storing processor-executing instructions, the instructions comprising:

instructions a to receive video image data;

instructions to calculate a brightness metric associated with of the video image data;

instructions to determine an intensity setting of a light source based at least in part on the brightness metric, wherein the light source illuminates a display that is configured to display a visual representation of the video image data;

instructions to scale brightness values of the video image data based at least in part on the brightness metric;

instructions to identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and instructions to reduce the scaling of the brightness values in the one or more regions without adjusting the video image data outside the regions to, at least partially, restore the contrast, thereby reducing the visual artifact.

16. A system comprising:

a processor;

memory;

a program module, wherein the program module is stored in the memory and configurable to be executed by the processor, the program module including:

instructions to receive video image data;

instructions to calculate a brightness metric of the video image data;

instructions to determine an intensity setting of a light source based at least in part on the brightness metric, wherein the light source illuminates a display that is configured to display a visual representation of the video image data;

instructions to scale brightness values of the video image data based at least in part on the brightness metric;

instructions to identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and instructions to reduce the scaling of the brightness values in the one or more regions without adjusting the video image data outside the regions to, at least partially, restore the contrast, thereby reducing the visual artifact.

17. A system comprising:

a processor;

a memory;

an instruction fetch unit within the processor configured to fetch:

instructions to receive video image data;

instructions to calculate a brightness metric of the video image data;

instructions to determine an intensity setting of a light source based at least in part on the brightness metric, wherein the light source illuminates a display that is configured to display a visual representation of the video image data;

instructions to scale brightness values of the video image data based at least in part on the brightness metric;

instructions to identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and instructions to reduce the scaling of the brightness values in the one or more regions without adjusting the video image data outside the regions to, at least partially, restore the contrast, thereby reducing the visual artifact; and an execution unit within the processor configured to execute the instructions to receive the video image data, the instructions to calculate the brightness metric, the instructions to determine the intensity setting and scaling the brightness values, and the instructions to reduce the scaling of the brightness values in the one or more regions.

18. An integrated circuit, comprising one or more sub-circuits, wherein the one or more sub-circuits are configured to:

receive video image data;

calculate a brightness metric of the video image data;

determine an intensity setting of a light source based at least in part on the brightness metric, wherein the light source illuminates a display that is configured to display a visual representation of the video image data;

scale brightness values of the video image data based at least in part on the brightness metric;

identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and reduce the scaling of the brightness values in the one or more regions without adjusting the video image data outside the regions to, at least partially, restore the contrast, thereby reducing the visual artifact.

19. An integrated circuit, comprising one or more sub-circuits, wherein the one or more sub-circuits are configured to:

determine an intensity setting of a light source based at least in part on a brightness metric of video image data, wherein the light source illuminates a display that is configured to display a visual representation of the video image data;

scale brightness values for the video image data based at least in part on the brightness metric;

identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and restore contrast in the one or more regions in the video image data in which the scaling of the brightness values results in a visual artifact associated with reduced contrast by, at least partially, reducing the scaling of the brightness values in the one or more regions without adjusting the video image data outside the regions.

20. A portable device, comprising:

a display;

a light source configured to output light;

an attenuation mechanism configured to modulate the output light incident on the display, the display configured to display a visual representation of video image data; and one or more integrated circuits, wherein the one or more integrated circuits are configured to:

determine an intensity setting of a light source based at least in part on a brightness metric of the video image data, wherein the light source illuminates a display that is configured to display a visual representation of the video image data;

scale brightness values for the video image data based at least in part on the brightness metric;

identify one or more regions in the video image data in which the scaling of the brightness values results in a visual artifact associated with reduced contrast, wherein each region of the one or more regions contains more than one percent of pixels in a frame of the video image and comprises less than an entirety of the video image data; and restore contrast in one or more regions in the video image data in which the scaling of the brightness values results in a visual artifact associated with reduced contrast by, at least partially, reducing the scaling of the brightness values in the one or more regions without adjusting the video image data outside the regions.

* * * * *